United States Patent [19]

Bernard et al.

[11] 4,093,247
[45] June 6, 1978

[54] CHUCK

[75] Inventors: Arthur Alexander Bernard, Beecher; Richard Allen Bernard, Flossmoor, both of Ill.

[73] Assignee: Darex Corporation, Beecher, Ill.

[21] Appl. No.: 707,026

[22] Filed: Jul. 20, 1976

Related U.S. Application Data

[62] Division of Ser. No. 594,349, Jul. 9, 1975, Pat. No. 4,001,975.

[51] Int. Cl.$^2$ ............................................. B23B 31/12
[52] U.S. Cl. ......................................... 279/53; 279/58
[58] Field of Search ................. 51/219, 73 R; 279/55, 279/51, 58, 53, 56, 46

[56] References Cited

U.S. PATENT DOCUMENTS

| 693,258 | 2/1902 | Furbish | 279/56 |
|---|---|---|---|
| 1,250,864 | 12/1917 | Halstead | 279/58 |
| 1,524,672 | 2/1925 | Rabut | 279/55 X |
| 1,816,648 | 7/1931 | Gray | 279/56 |
| 1,935,645 | 11/1933 | Lundin | 279/58 X |
| 2,367,719 | 1/1945 | Gallay | 279/53 X |
| 2,829,900 | 4/1958 | Davis | 279/58 |
| 2,833,546 | 5/1958 | Johnson | 279/51 |
| 2,883,200 | 4/1959 | Smith | 279/51 X |
| 2,907,149 | 10/1959 | Whitesel | 51/219 R |
| 3,060,580 | 10/1962 | Wells | 279/53 X |

FOREIGN PATENT DOCUMENTS

| 98,378 | 11/1924 | Austria | 279/56 |
|---|---|---|---|
| 489,857 | 11/1919 | France | 279/56 |
| 36,068 | 12/1911 | Sweden | 279/56 |

*Primary Examiner*—Othell M. Simpson
*Assistant Examiner*—W. D. Bray
*Attorney, Agent, or Firm*—Harold L. Stowell

[57] ABSTRACT

A drill holding chuck is provided having particular utility for use with a drill sharpening tool. The chuck includes an outer tubular housing having cylindrical ends rotably receivable in bearing members to provide spaced support for the chuck and the jaw closing force is applied to the chuck jaws about midway of their length.

5 Claims, 4 Drawing Figures

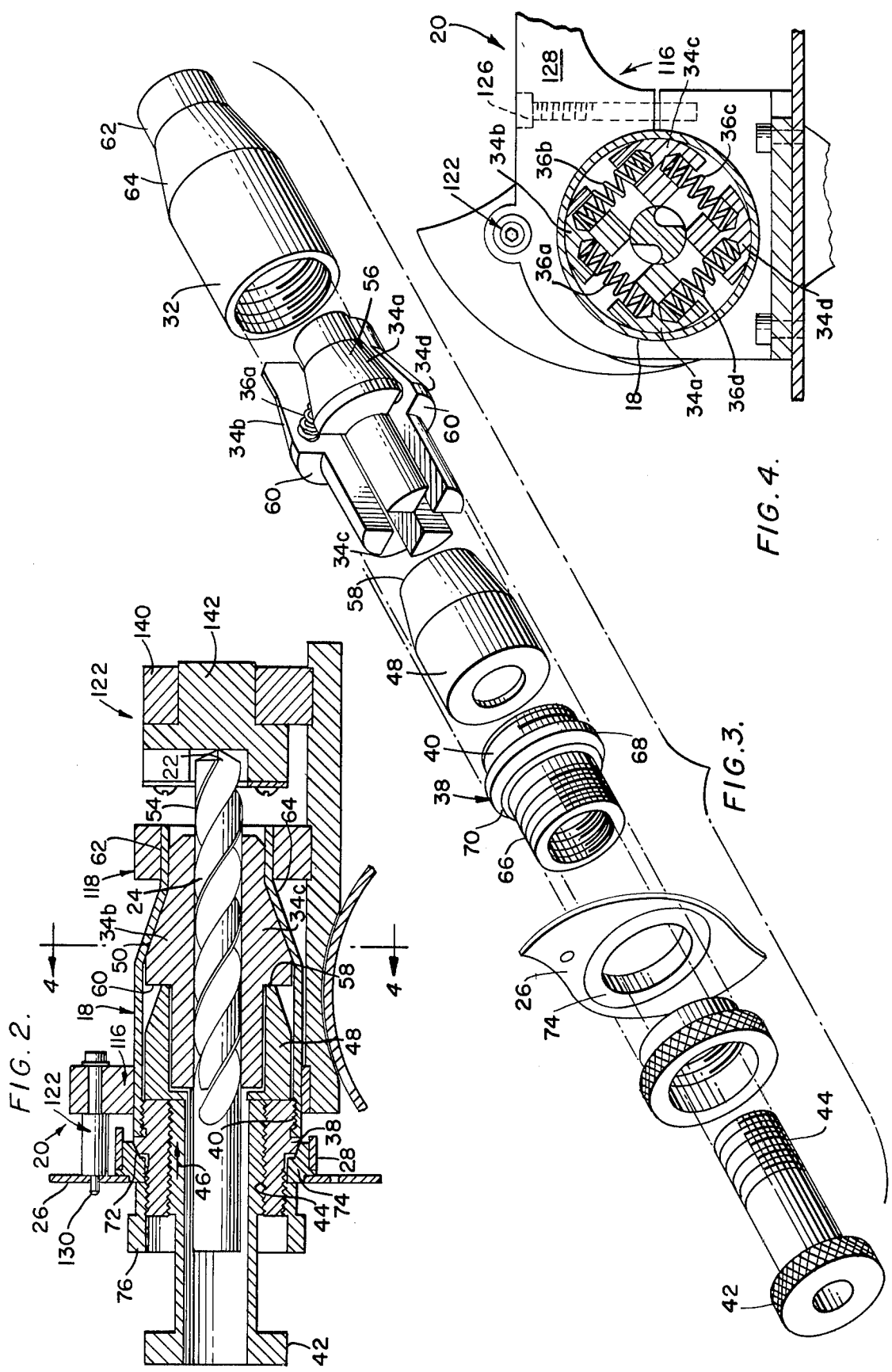

CHUCK

CROSS-REFERENCE TO RELATED APPLICATION

This application is a division of application Ser. No. 594,349 filed Jul. 9, 1975 for 37 Twist Drill Sharpener and Components Thereof", now U.S. Pat. No. 4,001,975.

BACKGROUND OF THE INVENTION

In our co-pending parent application their is disclosed a drill sharpener which produces the required configuration of movements at the cutting end of twist drills during the sharpening operation to quickly, accurately, and simultaneously grind and sharpen the cutting lips of two, three, four, etc. flute twist drills to any preferred drill point angle, to any preferred lip relief angle, to any preferred chisel angle, and very accurately locate the center of the chisel point with the center of the drill, by simply manually rotating a chuck containing the drill in a fixture as the cutting end of the drill is manually pressed against the face of a rotating grinding wheel.

The assembly includes a separately handled drill chuck having four jaws long enough to span the full length of one complete spiral of the flutes of the drill which for a ½ inch diameter drill with a standard helix angle is 2 and seveneighths inches long, and grip the drill close enough to the point to prevent vibration during the grinding operation. The drill chuck mounts two cams integral with each other which are normally free to rotate on the chuck but by the use of a clutch tightened by a hand knob are clutched to the chuck after the drill is clamped by the four jaws.

SUMMARY OF THE INVENTION

The present application is directed to the novel chuck disclosed in our said parent application Ser. No. 594,349 and which chuck may be defined as comprising an outer tubular body having a first cylindrical rearward end and a second cylindrical forward end; the diameter of the first cylindrical end being greater than the diameter of the second end and a sloping wall section between said first and second cylindrical ends; a plurality of jaw members, each jaw member including a forward arcuate portion corresponding to the forward cylindrical end of the tubular body, a rearward arcuate portion, and an arcuate sloping portion corresponding to the sloping portion of the tubular body; the rearward arcuate portion being stepped to provide a shoulder on each jaw and means for applying a closing force to the shoulder portion of each jaw. Also included in the scope of the present invention is the location of the force applying step on each jaw which is approximately midway between the ends of the jaws thereby insuring parallelism between the jaws and the drill supported thereby.

BRIEF DESCRIPTION OF THE DRAWING

FIG. 2 is a section on line 2—2 of FIG. 1;

FIG. 3 is an exploded view of the drill holding chuck assembly shown in FIG. 2; and FIG. 4 is a section on line 4—4 of FIG. 2;

DESCRIPTION OF THE PREFERRED EMBODIMENT

Figure 1:
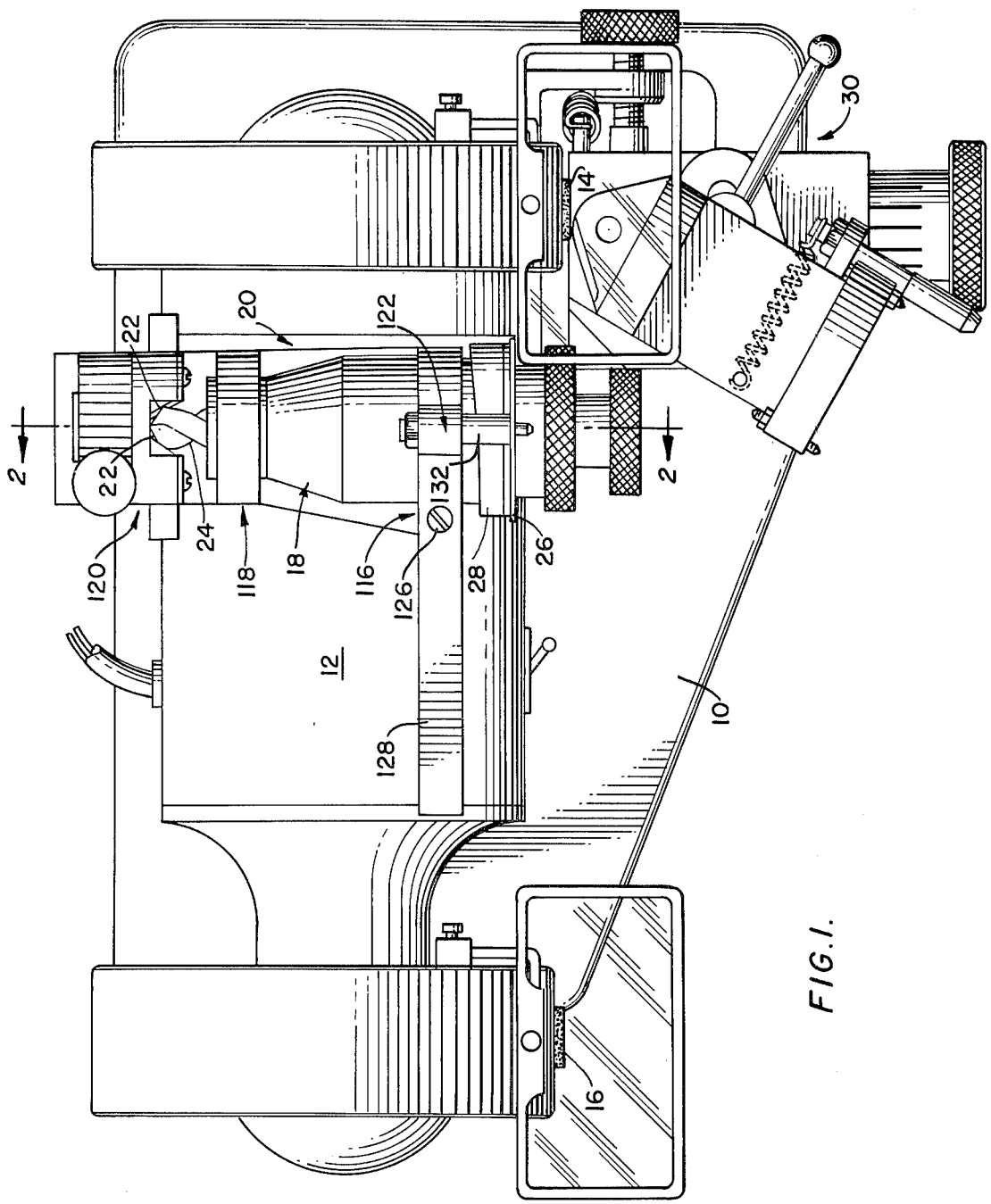
FIG. 1 is a top plain view of a drill sharpening device constructed in accordance with the teachings of the present invention.

Referring to FIG. 1, the drill sharpeners of the invention as a whole include a metal base 10. Mounted on the base 10 is, for example, a ⅓rd H.P., 3450 R.P.M. electric motor 12. The motor in the illustrated form of the invention has a double ended shaft on which are mounted two 6 inches diameter grinding wheels 14 and 16 preferably with a ¾ inch face. The grinding wheel 14 shown on the right is for the drill sharpening assembly and the wheel 16 on the left is for general use. The drill chuck 18 is shown inserted into the aligning fixture 20 and is used for aligning the cutting lips 22 of the drill 24 with a zero starting point on the two integral cams 26 and 28 prior to being transferred to the second or sharpening fixture 30 which is illustrated in greater detail in our application Ser. No. 594,349.

As will be described in more detail hereinafter, when the drill chuck 18 is inserted into the fixture 20, the integral cams 26 and 28 are free to rotate on the chuck 18 and it is after the alignment of the two cutting lips 22 that the clutch is engaged by turning a hand knob and this locks the zero starting point of the cams with the lips 22 of the drill 24.

THE DRILL CHUCK

Referring now to FIGS. 2, 3 and 4, the drill chuck portion 18 of this invention consists of an outer tubular shaped body 32; a set of four drill gripping jaws 34a, 34b, 34c and 34d; a set of four heavy duty compression springs 36a, 36b, 36c and 36d; a first bushing 38 which is threaded at 40 into one end of the tubular shaped body 32 of the chuck; a hand knob 43 which threads as at 44 into the first bushing 38 and is used for developing a push force indicated by arrow 46 which is applied to a second bushing 48 from where the push force is applied to the four jaws 34a, 34b, 34c, and 34d which are forced down through an included 36° cone shaped incline 50 to grip the drill 24.

For reasons which will be more fully described hereinafter, it is important to notice that the four jaws 34a, 34b, 34c and 34d are long enough to span one complete 360 degree spiral of that portion of twist drills commonly called the margin portion 54, and that each of the four jaws grip the drill in at least two locations of the two margins of the twist drill. It is also important to note that with this form of construction of the chuck the axis of all four jaws are parallel with the axis of the drill 24 which would not be the case if even only one of the four jaws contacted only one of the margins at only one location, because the drill would rock at this single point contact and hence the axis of the drill would not be parallel with the axis of the chuck. It was discovered that the axis of the drill has to be (1) exactly parallel with the axis of the chuck and (2) that the axis of drill has to be exactly in the center of the chuck. To provide both of these requirements the jaws of the chuck have to be long enough to span a full 360° spiral of the margins of the drill and which for a ½ inch diameter drill the jaws have to be not less than 2⅞ inches long. the diameter of the tubular shaped body 32 of the chuck 18 shown in the drawing is only 1⅞, and this small size was made possible by the configuration shown. Thus, the length of the jaws 34a, 34b, 34c and 34d should not be less than five times the diameter of the largest diameter drill the chuck will accommodate or, as stated above, the length of the jaws must not be less than one 360° spiraled open flute or margin.

Further, it will be noted that the quarter cone shaped portion 56 of each of the jaws is only about ⅓ the total length of the jaws when the included angle is 18° as shown. If the length of the cone formation 56 was the length of the jaws, the slope of the incline would be only about 8° and hence the end of the jaws would protrude much too far beyond the end of the chuck body when a small 1/16 inch diameter drill is gripped by the jaws and with only about an 8° slope the compression force required of the set of four springs 36a, 36b, 36c and 36d which spread the four jaws both outward and backward when the knob 22 is turned counterclockwise would be excessive. While the slope of a cone 56 in the illustrated form is 18°, the degree of the slope should be preferably not less than 15° and preferably not more than 25°. It will be seen from FIGS. 2 and 3 that the cone shaped portion 56 of each jaw is located a little past center toward the open end of the chuck so that it is the point end of the drill where the higher percentage of the gripping force is applied, to prevent the end of the drill from vibrating during the grinding operation and to keep the axis of all four jaws parallel with the axis of the chuck, whether or not a drill is gripped in the chuck, and to maintain contact between the flat circular end 58 of the second bushing 34 and the flat surface of the jaws identified by numeral 60 and not at the end of the jaws.

The body 32 of the chuck 18 is shaped to provide a straight cylinder portion 62 forward of the sloping wall section 64 (the inner surface of which contacts the slope 56 adjacent the forward end of each chuck jaw 34a, 34b, 34c and 34d). This straight cylinder portion 62 comprises one of the bearing surfaces for each of fixtures 20 and 30 as to be more fully detailed hereinafter.

The bushing 38, which is threaded to the rear end of the cylindrical housing 32 of the chuck 18 and into which is threaded the threads of 44 of the hand knob member 42, has further external threads 66 and annular flange 68, the rear face of which slopes as at 70. The sloping face 70 is adapted to engage the sloping face 72 of a ring 74 to which is secured the pair of cam elements 26 and 28. The mating faces 70 and 72 form means for clutching the pair of cams 26 and 28 to the chuck in conjunction with the hand knob 76 which is threadedly engaged with the threads 66 of bushing 38. By rotating the hand piece 76 counterclockwise, the ring 74 carrying the pair of cams 26 and 28 is free to rotate on the bushing and by rotating the hand piece 76 in a clockwise direction, the ring is clamped at the mating faces 70 and 72 and the flat mating faces of the inner end of the hand piece 76 and the rearward end of the bushing 74.

From the foregoing description of the preferred embodiment of the present invention, it will be seen that the relatively simple, but highly versatile, plural-jawed chuck fully accomplished the aims and objects hereinbefore set forth and others.

We claim:

1. In combination with a fluted twist drill sharpening device having a pair of spaced apart chuck receiving bearing surfaces; a plural-jawed chuck for gripping the fluted end of twist drills having two peripheral bearing surfaces receivable in the two bearing surfaces of the sharpening device; an outer tubular body having a first cylindrical rearward end and a second cylindrical forward end, the diameter of the first cylindrical end being greater than the diameter of the second end and a sloping wall section between said first and second cylindrical ends; a plurality of jaw members received in said tubular body, each said jaw member defining a clamping surface for gripping said drill and including a forward arcuate portion corresponding to the second cylindrical end of the tubular body, a rearward arcuate portion, and an arcuate sloping portion corresponding to the sloping portion of the tubular body; each said rearward arcuate portion being stepped to provide a shoulder on each jaw member; and means for applying a jaw closing force to said shoulder portion of each jaw, whereby the arcuate sloping portion on each of said jaw members is caused to co-act with the cylindrical sloping portion of the tubular body; said last named means including a bushing adapted to engage the shoulder on each jaw member, and a manually turnable knob having threaded engagement with internal threads on the rearward end of the outer tubular body and adapted to urge said bushing into chuck closing engagement with the shoulder on each jaw.

2. The invention as defined in claim 1 wherein each said shoulder is approximately midway between the forward and rearward ends of each of the jaw members.

3. The invention defined in claim 1 wherein the sloping portion of each jaw member is about ⅓ the total length of the jaws.

4. The plural-jawed chuck defined in claim 1 wherein the slope of the sloping portion of each jaw member is not less than 15° and not more than 25°.

5. The invention defined in claim 1 wherein the clamping surface of the jaw members are parallel with the axis of said two peripheral bearing surfaces and parallel with the axis of the drill, their lengths being not less than that length which will span the 360° spiraled flute of the largest diameter drill which can be inserted between said parallel surfaces.

* * * * *